US012731255B2

(12) United States Patent
Haddad et al.

(10) Patent No.: US 12,731,255 B2
(45) Date of Patent: Sep. 8, 2026

(54) SYSTEM AND METHOD FOR CNN SEGMENTATION FOR AUTOMATED KEY PHASE DETECTION IN DYNAMIC CONTRAST-ENHANCED LIVER MRI

(71) Applicant: GE Precision Healthcare LLC, Waukesha, WI (US)

(72) Inventors: Joshua Ian Haddad, Chicago, IL (US); Ty Allen Cashen, Madison, WI (US); Xinzeng Wang, Houston, TX (US); Arnaud Guidon, Somerville, MA (US)

(73) Assignee: GE Precision Healthcare LLC, Waukesha, WI (US)

( * ) Notice: Subject to any disclaimer, the term of this patent is extended or adjusted under 35 U.S.C. 154(b) by 195 days.

(21) Appl. No.: 18/910,758

(22) Filed: Oct. 9, 2024

(65) Prior Publication Data

US 2026/0099919 A1 Apr. 9, 2026

(51) Int. Cl.
*G06T 7/00* (2017.01)
*G06T 7/10* (2017.01)
(Continued)

(52) U.S. Cl.
CPC .............. *G06T 7/0012* (2013.01); *G06T 7/10* (2017.01); *G06T 2207/10096* (2013.01); *G06T 2207/20081* (2013.01); *G06T 2207/20084* (2013.01); *G06T 2207/30048* (2013.01); *G06T 2207/30056* (2013.01)

(58) Field of Classification Search
CPC ..................... G06T 7/0012; G06T 7/10; G06T 2207/10096; G06T 2207/20081; G06T 2207/20084; G06T 2207/30048; G06T 2207/30056; G06T 7/11; G06T 2207/10088; G06N 3/0455; G06N 3/0464; G06N 3/048; G06N 3/09; G06V 10/82; G06V 2201/031
See application file for complete search history.

(56) References Cited

FOREIGN PATENT DOCUMENTS

JP 2021126206 * 9/2021

OTHER PUBLICATIONS

Feng et al., RACER-GRASP: Respiratory-Weighted, Aortic Contrast Enhancement-Guided and Coil-Unstreaking Golden-Angle Radial Sparse MRI, Jul. 2019, 25 pgs.

(Continued)

*Primary Examiner* — Siamak Harandi
(74) *Attorney, Agent, or Firm* — Fletcher Yoder, P.C.

(57) ABSTRACT

A method includes acquiring a series of images over time from a liver of a subject injected with a contrast bolus, wherein the series of images span multiple phases of the contrast-enhanced scan. The method includes inputting the series of images into a trained neural network framework and utilizing the trained neural network framework to separately segment an aorta and a portal vein from each image of the series of images. The method includes utilizing the trained neural network framework to select exact respective time points for at least an aortic phase and a portal-venous phase based on the aorta and the portal vein segmented in each image. The method includes outputting a first set of images associated with the aortic phase and a second set of images associated with the portal-venous phase based on the exact respective time points selected for the aortic phase and the portal-venous phase.

20 Claims, 10 Drawing Sheets

(51) Int. Cl.
*G06T 7/11* (2017.01)
*G06V 10/82* (2022.01)

(56) References Cited

OTHER PUBLICATIONS

Feng et al., "Auto-DCE-MRI: A Deep-Learning Augmented Liver Imaging Framework for Fully-Automated Multiphase Assessment and Perfusion Mapping," 2018, 3 pgs.

* cited by examiner

SYSTEM AND METHOD FOR CNN SEGMENTATION FOR AUTOMATED KEY PHASE DETECTION IN DYNAMIC CONTRAST-ENHANCED LIVER MRI

BACKGROUND

The subject matter disclosed herein relates to medical imaging and, more particularly, to a system and method for convolutional neural network (CNN) segmentation for automated key phase detection in dynamic contrast-enhanced magnetic resonance imaging.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

During magnetic resonance imaging (MRI), when a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, or "longitudinal magnetization", $M_z$, may be rotated, or "tipped", into the x-y plane to produce a net transverse magnetic moment, $M_t$. A signal is emitted by the excited spins after the excitation signal $B_1$ is terminated and this signal may be received and processed to form an image.

When utilizing these signals to produce images, magnetic field gradients ($G_x$, $G_y$, and $G_z$) are employed. Typically, the region to be imaged is scanned by a sequence of measurement cycles in which these gradient fields vary according to the particular localization method being used. The resulting set of received nuclear magnetic resonance (NMR) signals are digitized and processed to reconstruct the image using one of many well-known reconstruction techniques.

To enhance certain anatomical features, some MRI scans may include the administration of a contrast agent to a subject being imaged. Contrast enhanced MRI is conducted by injecting a contrast agent that circulates to specific anatomies and increases their signal. Varying patient vascular flow changes the signal increase over time for each individual. For example, MRI contrast boluses are used in liver imaging to enhance specific anatomies and reveal finer details when diagnosing patient pathology. Different groupings of anatomy enhancement in liver imaging are categorized as pre-contrast, early-later arterial, portal venous, and delayed phases. Contrast enhanced imaging requires generation of 4D time-series data and requires a radiologist selection of the contrast-enhanced phases (e.g., arterial, portal venous) corresponding to peak enhancement in various anatomies for optical image interpretation. In the arterial phases the abdominal aorta and hepatic artery are fully enhanced. Similarly, the portal venous phase is marked by the peak enhancement of the portal vein. The pre-contrast and delayed phase correspond to the time before contrast was injected and after the contrast enhancement has reached steady-state. Key phase detection methods are used to automate parts of this process. Previous efforts at key phase detection have used manual selection or used anatomy-specific automatic selection algorithms which give discrete time estimations of phase boundaries.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a computer-implemented method for automatic detection of key phases for a contrast-enhanced scan is provided. The computer-implemented method includes acquiring, via a processing system including one or more processors, a series of images over time of a liver of a subject injected with a contrast bolus, wherein the series of images span multiple phases of the contrast-enhanced scan, and wherein the multiple phases include a pre-contrast phase, an aortic phase, a portal-venous phase, and a delayed phase. The computer-implemented method also includes inputting, via the processing system, the series of images into a trained neural network framework. The computer-implemented method further includes utilizing, via the processing system, the trained neural network framework to separately segment an aorta and a portal vein from each image of the series of images. The computer-implemented method even further includes utilizing, via the processing system, the trained neural network framework to select exact respective time points for at least the aortic phase and the portal-venous phase based on the aorta and the portal vein segmented in each image of the series of images. The computer-implemented method still further includes outputting, via the processing system, a first set of images associated with the aortic phase and a second set of images associated with the portal-venous phase based on the exact respective time points selected for the aortic phase and the portal-venous phase.

In another embodiment, a system for automatic detection of key phases for a contrast-enhanced scan is provided. The system includes a memory encoding processor-executable routines. The system also includes a processing system including one or more processors and configured to access the memory and to execute the processor-executable routines, wherein the processor-executable routines, when executed by the processing system, cause the processing system to perform actions. The actions include acquiring a series of images over time of a liver of a subject injected with a contrast bolus, wherein the series of images span multiple phases of the contrast-enhanced scan, and wherein the multiple phases include a pre-contrast phase, an aortic phase, a portal-venous phase, and a delayed phase. The actions also include inputting the series of images into a trained neural network framework. The actions further include utilizing the trained neural network framework to separately segment an aorta and a portal vein from each image of the series of images. The actions even further include utilizing the trained neural network framework to select exact respective time points for at least the aortic phase and the portal-venous phase based on the aorta and the portal vein segmented in each image of the series of images. The actions still further include outputting a first set of images associated with the aortic phase and a second set of images associated with the portal-venous phase based on the exact respective time points selected for the aortic phase and the portal-venous phase.

In a further embodiment, a non-transitory computer-readable medium, the computer-readable medium including processor-executable code that when executed by a processing system including one or more processors, causes the processing system to perform actions. The actions include acquiring a series of images over time of a liver of a subject injected with a contrast bolus, wherein the series of images span multiple phases of a contrast-enhanced scan, and wherein the multiple phases include a pre-contrast phase, an aortic phase, a portal-venous phase, and a delayed phase. The actions also include inputting the series of images into a trained neural network framework. The actions further include utilizing the trained neural network framework to separately segment an aorta and a portal vein from each image of the series of images. The actions even further include utilizing the trained neural network framework to select exact respective time points for at least the aortic phase and the portal-venous phase based on the aorta and the portal vein segmented in each image of the series of images. The actions still further include outputting a first set of images associated with the aortic phase and a second set of images associated with the portal-venous phase based on the exact respective time points selected for the aortic phase and the portal-venous phase.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
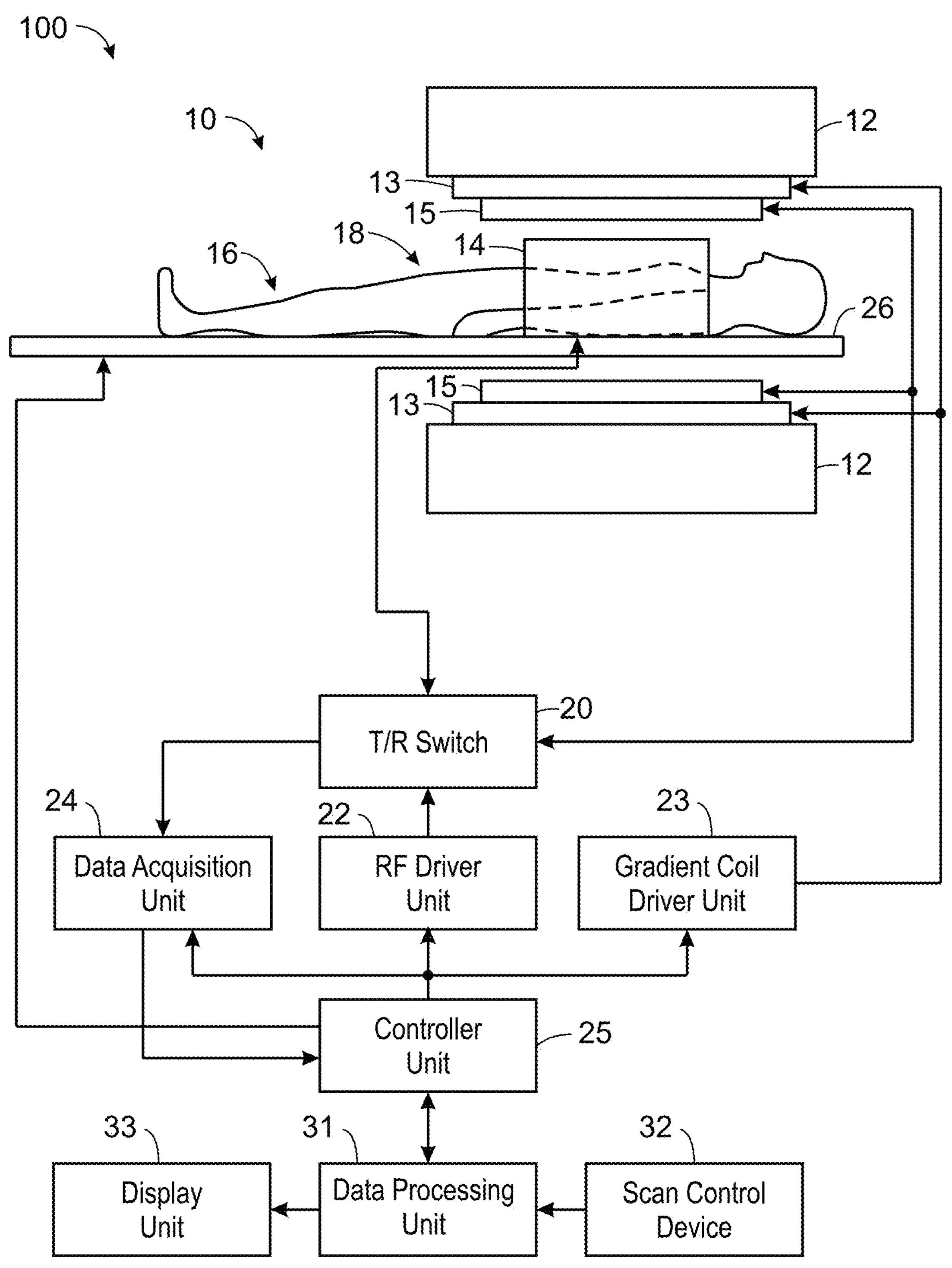
FIG. 1 is a block diagram of an MRI apparatus, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While aspects of the following discussion are provided in the context of medical imaging, it should be appreciated that the disclosed techniques are not limited to such medical contexts. Indeed, the provision of examples and explanations in such a medical context is only to facilitate explanation by providing instances of real-world implementations and applications. However, the disclosed techniques may also be utilized in other contexts, such as image reconstruction for non-destructive inspection of manufactured parts or goods (i.e., quality control or quality review applications), and/or the non-invasive inspection of packages, boxes, luggage, and so forth (i.e., security or screening applications). In general, the disclosed techniques may be useful in any imaging or screening context or image processing or photography field where a set or type of acquired data undergoes a reconstruction process to generate an image or volume.

Deep learning (DL) approaches discussed herein may be based on artificial neural networks, and may therefore encompass one or more of deep neural networks, fully connected networks, convolutional neural networks (CNNs), transformer-based networks, unrolled neural networks, perceptrons, encoders-decoders, recurrent networks, wavelet filter banks, u-nets, general adversarial networks (GANs), dense neural networks, or other neural network architectures. The neural networks may include shortcuts, activations, batch-normalization layers, and/or other features. These techniques are referred to herein as DL techniques, though this terminology may also be used specifically in reference to the use of deep neural networks, which is a neural network having a plurality of layers.

As discussed herein, DL techniques (which may also be known as deep machine learning, hierarchical learning, or deep structured learning) are a branch of machine learning techniques that employ mathematical representations of data and artificial neural networks for learning and processing such representations. By way of example, DL approaches may be characterized by their use of one or more algorithms to extract or model high level abstractions of a type of data-of-interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data. In general, the processing from one representation space to the next-level representation space can be considered as one 'stage' of the process. Each stage of the process can be performed by separate neural networks or by different parts of one larger neural network.

In the following disclosure, bolus tracking is defined as monitoring or generation of signal over time curve of an anatomy associated with a contrast bolus. Also, in the following disclosure, key phase selection is defined as using the contrast curve to select the time point corresponding to ideal contrast (e.g., maximum or peak contrast) in a given anatomy. Although the techniques described in the following disclosure are described in the context of MRI, the techniques may also be utilized with dynamic computed tomography (CT).

The following description relates to utilizing neural network framework-based (e.g., AI or CNN-based) segmentation for automated key phase detection in dynamic contrast-enhanced magnetic resonance imaging. The trained neural network framework is an anatomy-agnostic framework configured to predict exact phase time points for key phase selection. In particular, phases for the maximum aortic contrast (aortic phase) and portal-vein contrast (portal-venous phase) can be found utilizing the general framework (which includes separate CNN segmentation models for separately segmenting the aorta and portal vein in each image). The following description includes techniques for selecting (e.g., automatically) these phases by selecting exact time points for each phase. By selecting phases automatically, the workflow of the radiologist is improved allowing for faster lead times. Instead of manually searching through images, which takes time and is prone to human error, optimal images can be found without human supervision. Additionally, when integrated into a reconstruction framework, the phase selection can be conducted at arbitrary temporal granularity which can lead to improved image quality of the selected phases.

FIG. 1 illustrates an MRI apparatus 10 (e.g., an MRI system) that includes a magnetostatic field magnet unit 12, a gradient coil unit 13, an RF coil unit 14, an RF body coil unit 15 (e.g., volume coil unit), a transmit/receive (T/R) switch 20, an RF driver unit 22, a gradient coil driver unit 23, a data acquisition unit 24, a controller unit 25, a patient bed or table 26, a data processing unit 31, a scan control device 32, and a display unit 33. In some embodiments, the RF coil unit 14 is a surface coil, which is a local coil typically placed proximate to the anatomy of interest of a subject 16. Herein, the RF body coil unit 15 is a transmit coil that transmits RF signals, and the local surface of the RF coil unit 14 receives the MR signals. As such, the transmit body coil (e.g., RF body coil unit 15) and the surface receive coil (e.g., RF coil unit 14) are separate but electromagnetically coupled components. The MRI apparatus 10 transmits electromagnetic pulse signals to the subject 16 placed in an imaging space 18 with a static magnetic field formed to perform a scan for obtaining magnetic resonance signals from the subject 16. One or more images of the subject 16 can be reconstructed based on the magnetic resonance signals thus obtained by the scan.

The magnetostatic field magnet unit 12 includes, for example, an annular superconducting magnet, which is mounted within a toroidal vacuum vessel. The magnet defines a cylindrical space surrounding the subject 16 and generates a constant primary magnetostatic field $B_0$.

The MRI apparatus 10 also includes a gradient coil unit 13 that forms a gradient magnetic field in the imaging space 18 so as to provide the magnetic resonance signals received by the RF coil arrays with three-dimensional positional information. The gradient coil unit 13 includes three gradient coil systems, each of which generates a gradient magnetic field along one of three spatial axes perpendicular to each other, and generates a gradient field in each of a frequency encoding direction, a phase encoding direction, and a slice selection direction in accordance with the imaging condition. More specifically, the gradient coil unit 13 applies a gradient field in the slice selection direction (or scan direction) of the subject 16, to select the slice; and the RF body coil unit 15 or the local RF coil arrays may transmit an RF pulse to a selected slice of the subject 16. The gradient coil unit 13 also applies a gradient field in the phase encoding direction of the subject 16 to phase encode the magnetic resonance signals from the slice excited by the RF pulse. The gradient coil unit 13 then applies a gradient field in the frequency encoding direction of the subject 16 to frequency encode the magnetic resonance signals from the slice excited by the RF pulse.

The RF coil unit 14 is disposed, for example, to enclose the region to be imaged of the subject 16. In some examples, the RF coil unit 14 may be referred to as the surface coil or the receive coil. In the static magnetic field space or imaging space 18 where a static magnetic field $B_0$ is formed by the magnetostatic field magnet unit 12, the RF body coil unit 15 transmits, based on a control signal from the controller unit 25, an RF pulse that is an electromagnet wave to the subject 16 and thereby generates a high-frequency magnetic field $B_1$. This excites a spin of protons in the slice to be imaged of the subject 16. The RF coil unit 14 receives, as a magnetic resonance signal, the electromagnetic wave generated when the proton spin thus excited in the slice to be imaged of the subject 16 returns into alignment with the initial magnetization vector. In some embodiments, the RF coil unit 14 may transmit the RF pulse and receive the MR signal. In other embodiments, the RF coil unit 14 may only be used for receiving the MR signals, but not transmitting the RF pulse.

The RF body coil unit 15 is disposed, for example, to enclose the imaging space 18, and produces RF magnetic field pulses orthogonal to the main magnetic field $B_0$ produced by the magnetostatic field magnet unit 12 within the imaging space 18 to excite the nuclei. In contrast to the RF coil unit 14, which may be disconnected from the MRI apparatus 10 and replaced with another RF coil unit, the RF body coil unit 15 is fixedly attached and connected to the MRI apparatus 10. Furthermore, whereas local coils such as the RF coil unit 14 can transmit to or receive signals from only a localized region of the subject 16, the RF body coil unit 15 generally has a larger coverage area. The RF body coil unit 15 may be used to transmit or receive signals to the whole body of the subject 16, for example. Using receive-only local coils and transmit body coils provides a uniform RF excitation and good image uniformity at the expense of high RF power deposited in the subject. For a transmit-receive local coil, the local coil provides the RF excitation to the region of interest and receives the MR signal, thereby decreasing the RF power deposited in the subject. It should be appreciated that the particular use of the RF coil unit 14 and/or the RF body coil unit 15 depends on the imaging application.

The T/R switch 20 can selectively electrically connect the RF body coil unit 15 to the data acquisition unit 24 when operating in receive mode, and to the RF driver unit 22 when operating in transmit mode. Similarly, the T/R switch 20 can selectively electrically connect the RF coil unit 14 to the data acquisition unit 24 when the RF coil unit 14 operates in receive mode, and to the RF driver unit 22 when operating in transmit mode. When the RF coil unit 14 and the RF body coil unit 15 are both used in a single scan, for example if the RF coil unit 14 is configured to receive MR signals and the RF body coil unit 15 is configured to transmit RF signals, then the T/R switch 20 may direct control signals from the RF driver unit 22 to the RF body coil unit 15 while directing received MR signals from the RF coil unit 14 to the data acquisition unit 24. The coils of the RF body coil unit 15 may be configured to operate in a transmit-only mode or a transmit-receive mode. The coils of the RF coil unit 14 may be configured to operate in a transmit-receive mode or a receive-only mode.

The RF driver unit 22 includes a gate modulator (not shown), an RF power amplifier (not shown), and an RF oscillator (not shown) that are used to drive the RF coils (e.g., RF body coil unit 15) and form a high-frequency magnetic field in the imaging space 18. The RF driver unit 22 modulates, based on a control signal from the controller unit 25 and using the gate modulator, the RF signal received from the RF oscillator into a signal of predetermined timing having a predetermined envelope. The RF signal modulated by the gate modulator is amplified by the RF power amplifier and then output to the RF body coil unit 15.

The gradient coil driver unit 23 drives the gradient coil unit 13 based on a control signal from the controller unit 25 and thereby generates a gradient magnetic field in the imaging space 18. The gradient coil driver unit 23 includes three systems of driver circuits (not shown) corresponding to the three gradient coil systems included in the gradient coil unit 13.

The data acquisition unit 24 includes a pre-amplifier (not shown), a phase detector (not shown), and an analog/digital converter (not shown) used to acquire the magnetic resonance signals received by the RF coil unit 14. In the data acquisition unit 24, the phase detector phase detects, using the output from the RF oscillator of the RF driver unit 22 as a reference signal, the magnetic resonance signals received from the RF coil unit 14 and amplified by the pre-amplifier, and outputs the phase-detected analog magnetic resonance signals to the analog/digital converter for conversion into digital signals. The digital signals thus obtained are output to the data processing unit 31.

The MRI apparatus 10 includes a table 26 for placing the subject 16 thereon. The subject 16 may be moved inside and outside the imaging space 18 by moving the table 26 based on control signals from the controller unit 25.

The controller unit 25 includes a computer and a recording medium on which a program to be executed by the computer is recorded. The program when executed by the computer causes various parts of the apparatus to carry out operations corresponding to predetermined scanning. The recording medium may comprise, for example, a ROM, flexible disk, hard disk, optical disk, magneto-optical disk, CD-ROM, or non-volatile memory card. The controller unit 25 is connected to the scan control device 32 and processes the operation signals input to the scan control device 32 and furthermore controls the table 26, RF driver unit 22, gradient coil driver unit 23, and data acquisition unit 24 by outputting control signals to them. The controller unit 25 also controls, to obtain a desired image, the data processing unit 31 and the display unit 33 based on operation signals received from the scan control device 32.

The scan control device 32 includes user input devices such as a touchscreen, keyboard and a mouse. The scan control device 32 is used by an operator, for example, to input such data as an imaging protocol and to set a region where an imaging sequence is to be executed. The data about the imaging protocol and the imaging sequence execution region are output to the controller unit 25.

The data processing unit 31 includes a computer and a recording medium on which a program to be executed by the computer to perform predetermined data processing is recorded. The data processing unit 31 is connected to the controller unit 25 and performs data processing based on control signals received from the controller unit 25. The data processing unit 31 is also connected to the data acquisition unit 24 and generates spectrum data by applying various image processing operations to the magnetic resonance signals output from the data acquisition unit 24.

The display unit 33 includes a display device and displays an image on the display screen of the display device based on control signals received from the controller unit 25. The display unit 33 displays, for example, an image regarding an input item about which the operator inputs operation data from the scan control device 32. The display unit 33 also displays a two-dimensional (2D) slice image or three-dimensional (3D) image of the subject 16 generated by the data processing unit 31.

During an MRI scan using the MRI apparatus 10, a subject may be positioned within the imaging space 18 and an acquisition protocol may be carried out to obtain MR signals of the subject. The acquisition protocol may include a plurality of pulse sequences where in each pulse sequence, contrast is prepared via one or more RF pulses applied by the RF body coil unit 15 and the gradient coil unit 13 is controlled to spatially encode the resultant MR signals. The spatially-encoded MR signals are received by the RF coil unit 14 are digitized and stored in k-space. Thus, k-space data or a k-space dataset may refer to the raw MR signals prior to processing into an image. In some examples, one line of k-space may be filled with the raw MR signals per pulse sequence (also referred to as repetition time). In other examples, one line of k-space may be filled with the raw MR signals per echo, where more than one echo is generated per pulse sequence/repetition time. The k-space data may also be referred to as imaging data or MR data herein.

Figure 2:
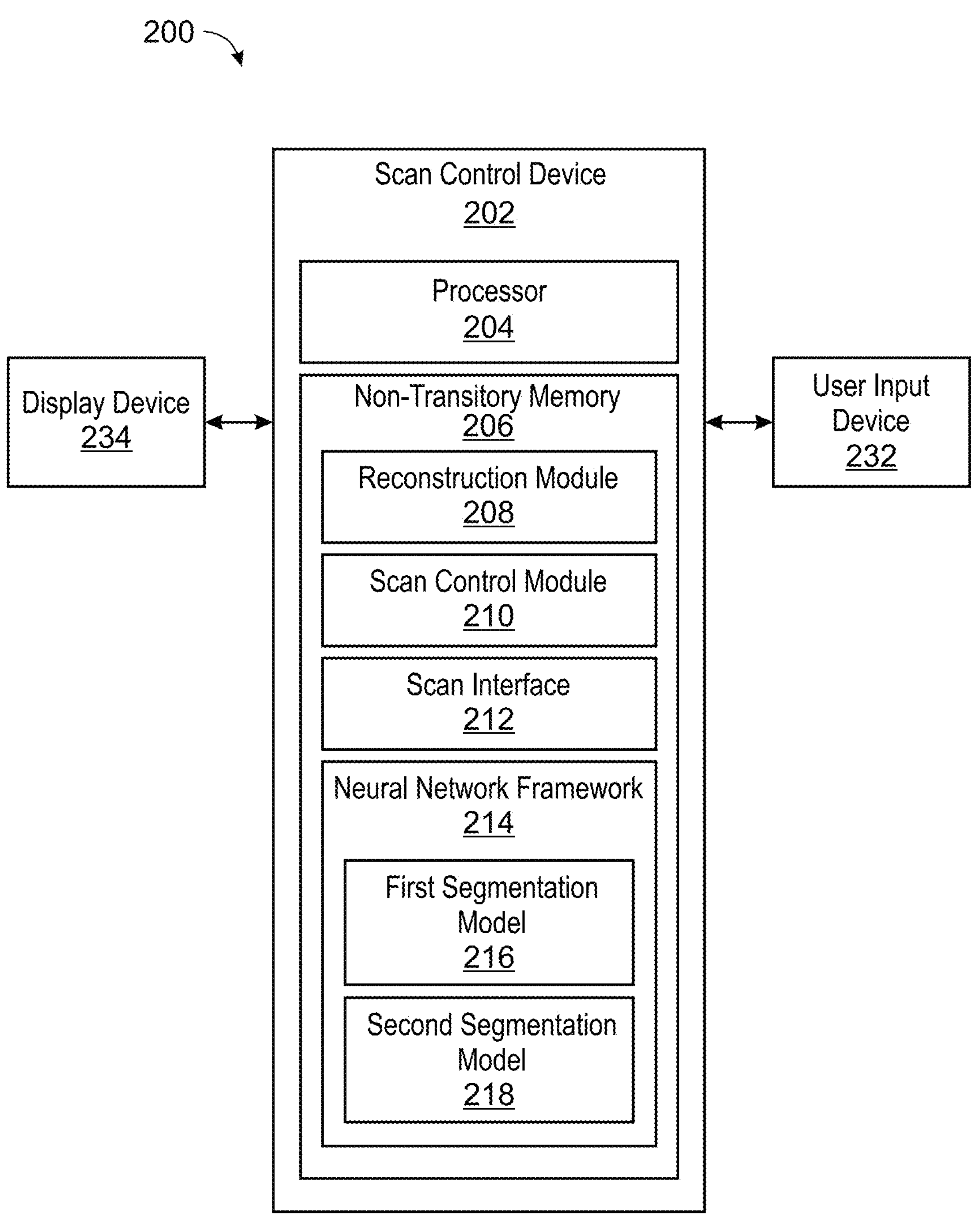
FIG. 2 is a schematic diagram of a scan control device of the MRI apparatus in FIG. 1, in accordance with aspects of the present disclosure.

Referring to FIG. 2, scan control device 202 configured to control scan parameters of an MRI scan is shown. In some embodiments, scan control device 202 is incorporated into the MRI apparatus 10. For example, scan control device 202 may be provided in the MRI apparatus 10 as scan control device 32. In some embodiments, at least a portion of scan control device 202 is disposed at a device (e.g., edge device, server, etc.) communicably coupled to the MRI apparatus 10 via wired and/or wireless connections. In some embodiments, at least a portion of scan control device 202 is disposed at a separate device (e.g., a workstation) which can communicate with the controller unit of the MRI apparatus, for example. Scan control device 202 may be operably/communicatively coupled to a user input device 232 and a display device 234. In some examples, the user input device 232 may be the user input device of scan control device 32, explained above. Likewise, display device 234 may be the display unit 33 of MRI apparatus 10.

Scan control device 202 includes one or more processors, such as processor 204, configured to execute machine readable instructions stored in non-transitory memory 206. Processor 204 may be single core or multi-core, and the programs executed thereon may be configured for parallel or distributed processing. In some embodiments, processor 204 may optionally include individual components that are distributed throughout two or more devices, which may be remotely located and/or configured for coordinated processing. In some embodiments, one or more aspects of processor 204 may be virtualized and executed by remotely-accessible networked computing devices configured in a cloud computing configuration.

Non-transitory memory 206 may store a reconstruction module 208, a scan control module 210, and a scan interface 212. Reconstruction module 208 may be configured to reconstruct images from k-space data. In some examples, reconstruction module 208 may be the data processing unit 31 of FIG. 1, such that the data processing unit and scan control device are integrated into a single device. However, in other examples, reconstruction module 208 may be omitted and scan control device 202 may be in communication with the data processing unit 31 to obtain images for display.

Scan control module 210 may be configured to send commands to the MRI apparatus (e.g., to controller unit 25) in order to control aspects of a scan carried out by the MRI apparatus. Scan control module 210 may control aspects of the scan based on user input, which may be received via the scan interface 212, in some examples. For example, the scan interface 212 may include a scan prescription display panel via which a user may set parameters for the scan (e.g., the number of phases, delay time between phases). The scan interface 212 may further include various scan control buttons, such as a live scan button that, when selected by a user, is configured to trigger acquisition and display (on the scan interface 212) of live 2D images and a start contrast scan button that, when selected, is configured to trigger acquisition of post-contrast (e.g., 3D) images. Scan control module 210 may process the acquired live 2D images in order to measure contrast level in an ROI, and the scan interface 212 may display a plot of the measured contrast level over time.

Non-transitory memory 206 may also store a trained neural network framework 214. The trained neural network framework 214 is an anatomy-agnostic framework configured to predict exact phase time points for key phase selection. In particular, phases for the maximum aortic contrast (aortic phase) and portal-vein contrast (portal-venous phase) can be found utilizing the trained neural network framework 214. The trained neural network framework is configured to select (e.g., automatically) these phases by selecting exact time points for each phase. The trained neural network framework 214 includes a first segmentation model 216 (e.g., AI segmentation model) configured to segment the aorta from each image of a series of images (e.g., dynamic series of images). The series of images are acquired with the MRI apparatus 10 in FIG. 1 over time from a liver of a subject (who in some embodiments is freely breathing during the scan) injected with a contrast bolus during a contrast-enhanced scan. The series of images span multiple phases of the contrast-enhanced scan. The multiple phases include a pre-contrast phase, an aortic phase, a portal-venous phase, and a delayed phase. The first segmentation model 216 is configured to select peak (e.g., maximum) aortic phase time point (e.g., utilizing a bolus signal for phase selection). The trained neural network framework 214 also includes a second segmentation model 218 (CNN-based segmentation model) that is separate from the first segmentation model 216. The second segmentation model 218 is configured to separately segment the portal vein from each image of the series of images. The second segmentation mode 218 is also configured to select peak portal-venous time point (e.g., utilizing a bolus signal for phase selection).

In some embodiments, non-transitory memory 206 may include components disposed at two or more devices, which may be remotely located and/or configured for coordinated processing. In some embodiments, one or more aspects of non-transitory memory 206 may include remotely-accessible networked storage devices configured in a cloud computing configuration.

User input device 232 may comprise one or more of a touchscreen, a keyboard, a mouse, a trackpad, a motion sensing camera, or other device configured to enable a user to interact with and manipulate data within scan control device 202. In one example, user input device 232 may enable a user to make a selection of a scan protocol, adjust scan prescription settings, select or adjust a contrast-tracking region, and the like, as well as initiate, pause, and adjust scanning.

Display device 234 may include one or more display devices utilizing virtually any type of technology. In some embodiments, display device 234 may comprise a computer monitor, and may display MR images, including images reconstructed by reconstruction module 208. Display device 234 may be combined with processor 204, non-transitory memory 206, and/or user input device 232 in a shared enclosure, or may be peripheral display devices and may comprise a monitor, touchscreen, projector, or other display device known in the art, which may enable a user to view MRI images produced by an MRI system, and/or interact with various data stored in non-transitory memory 206.

It should be understood that scan control device 202 shown in FIG. 2 is for illustration, not for limitation. Another appropriate image processing system may include more, fewer, or different components.

Figure 3:
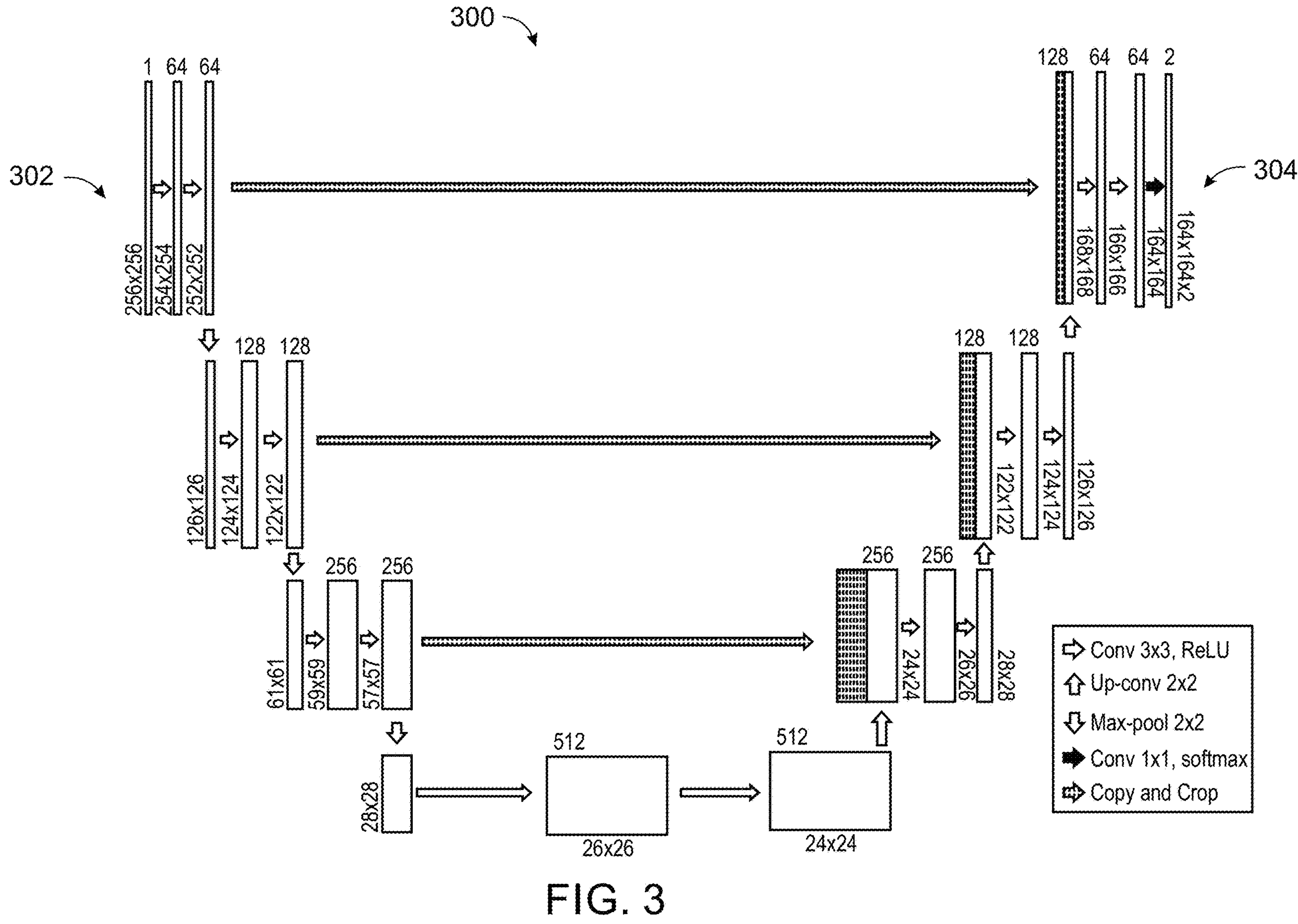
FIG. 3 is a schematic diagram of an architecture for segmentation models, in accordance with aspects of the present disclosure.

FIG. 3 is a schematic diagram of an architecture 300 for the first segmentation model 216 and the segmentation model 218 in FIG. 2. Both the first segmentation model 216 and the second segmentation model 218 in FIG. 2 are trained CNNs. The architecture 300 for these segmentation models 216, 218 is a U-net architecture. In medical imaging, a U-net architecture increases segmentation performance even with a low number of examples for training. The architecture 300 utilizes a contracting (encoder) path 302 and an expansive (decoder) path 304 to propagate information. The contracting path 302 encodes the information with increasing levels of filters. The expansive path 30 decodes the information by incorporating the coarse-detail features in the current level with the unsampled finer-detail features from the previous level. In the contracting path 302 two 3×3 unpadded convolutions with rectified linear unit (ReLU) activation are fed to 2×2 max pooling layers with stride 2 to downsample the input while doubling the feature maps in each level. The expansive path 304 upsamples the feature maps, concatenates the encoder output at the corresponding level, and conducts 2×2 convolutions with ReLU activation similar to the encoder. This decoding scheme retains information from the lower-detail feature maps from the current encoder level while incorporating the finer-detail feature maps from the previous level. The final layer in the top level of the expansive path 304 uses a 1×1 convolution with SoftMax activation to map each pixel in the input image to a binary segmentation denoting background or the segmented class.

Figure 4:
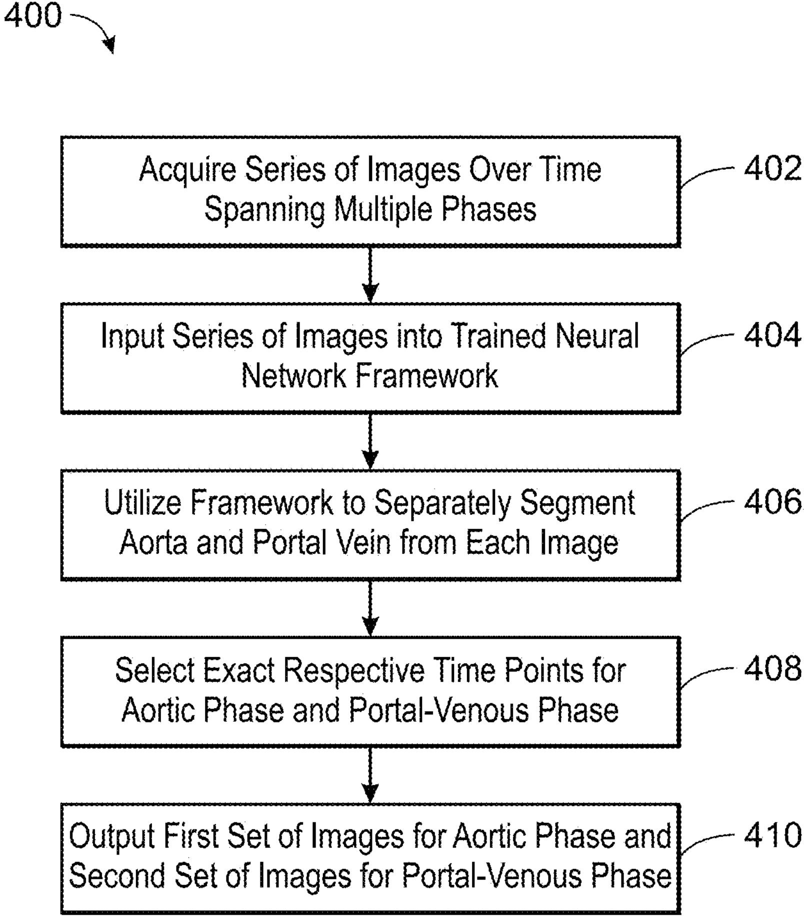
FIG. 4 is a flow diagram of a method for automatic detection of key phases for a contrast-enhanced scan, in accordance with aspects of the present disclosure.

FIG. 4 depicts a flow diagram of a method 400 for automatic detection of key phases for a contrast-enhanced scan (e.g., MRI or dynamic CT). One or more steps of the method 400 may be performed by processing circuitry of the MRI apparatus 10 in FIG. 1 or of a CT system.

The method 400 includes acquiring a series (e.g., dynamic series) of images over time from a liver of a subject injected with a contrast bolus (block 402). The series of images span multiple phases of the contrast-enhanced scan including a pre-contrast phase, an aortic phase, a portal-venous phase, and a delayed phase. The series of images are reconstructed from imaging data acquired during the contrast-enhanced scan. In certain embodiments, the subject may be freely breathing (as opposed to holding their breath) during the contrast-enhanced scan.

The method 400 also includes inputting the series of images into a trained neural network framework (block 404). The trained neural network framework includes a phase selection algorithm that includes a first segmentation model (aortic segmentation model) configured to segment the aorta from each image of the series of images and to select peak aortic phase time point. The phase selection algorithm of the trained neural network framework also includes a second segmentation model (portal-venous segmentation model) that is separate from the first segmentation model and configured to segment the portal vein from each image of the series of images and select peak portal-venous time point. Each of the segmentation models was trained on multiple contrast enhanced series (e.g., contrast enhanced MRI series) of the abdomen where the aorta and portal vein are manually segmented. In certain embodiments, the training datasets were acquired utilizing stack-of-stars differential subsampling with Cartesian ordering (DISCO Star) and/or stack-of-stars liver acquisition with volume acceleration (LAVA Star). Supervised learning was utilized in training the segmentation models.

The method 400 further includes utilizing the trained neural network framework to separately segment an aorta and a portal vein from each image of the series of images (block 406). In particular, the aortic segmentation model generates segmentation masks of the aorta for aortic phase selection and the portal-venous segmentation model generates segmentation masks of the portal vein for portal-venous phase selection.

The method 400 even further includes utilizing the trained neural network framework to select exact respective time points for at least the aortic phase and the portal-venous phase based on the aorta and the portal vein segmented in each image of the series of images (block 408). The exact respective time points are selected by the trained neural network framework based on respective contrast signal over time in the aorta and the portal vein segmented in each image of the series of images. In certain embodiments, the segmentation masks across phases are averaged to generate a vote-weighted mask where each pixel in the image is weighted based on the votes it receives across all phases. Pixels which are not present in at least 50 percent of phases are labeled as background and the higher weighted pixels are labeled as the anatomy (i.e., aorta or portal vein). The aortic phase selection uses all phases for the voting process as the aorta is clearly defined across time. In the non-portal venous phases, the portal vein is not well defined. Therefore, using the prior that the portal-venous phase occurs approximately after 60 seconds after aortic enhancement, phases between 45 seconds and 75 seconds after aortic enhancement are used to generate the weighted mask for the portal vein. For each slice, the masks are passed through various filters to reduce noise. In certain embodiments, blob labeling is utilized with blobs containing fewer than 20 pixels being categorized as noise and removed from the mask. For the aorta, the largest sized blob is taken as the aorta. For the portal vein, all blobs above the size threshold are utilized. The threshold may vary. Using the resultant mask (i.e., for the aorta or the portal vein), the average signal within the masked region is collected across all phases to generate signal (bolus signal) over time curves for each slice. The signals are clustered based on their correlation to other slices and uncorrelated slice signals are discard. In certain embodiments, two slices are defined as being correlated if they have correlation above 90 percent. In certain embodiments, slices that are correlated with at least 50 percent of other slices are correlated and the resultant signal is taken as the average of all correlated signals. The selected phase corresponds to the phase where the resultant signal achieves a maximum signal. The aorta segmentation model and the portal vein segmentation model are configured to predict the exact ground truth phase with peak enhancement for the aortic phase and the portal-venous phase, respectively. The method 400 still further includes outputting a first set of images associated with the aortic phase from the series of images and a second set of images associated with the portal-venous phase from the series of images based on the exact respective time points selected for the aortic phase and the portal-venous phase (block 410).

Figure 5:
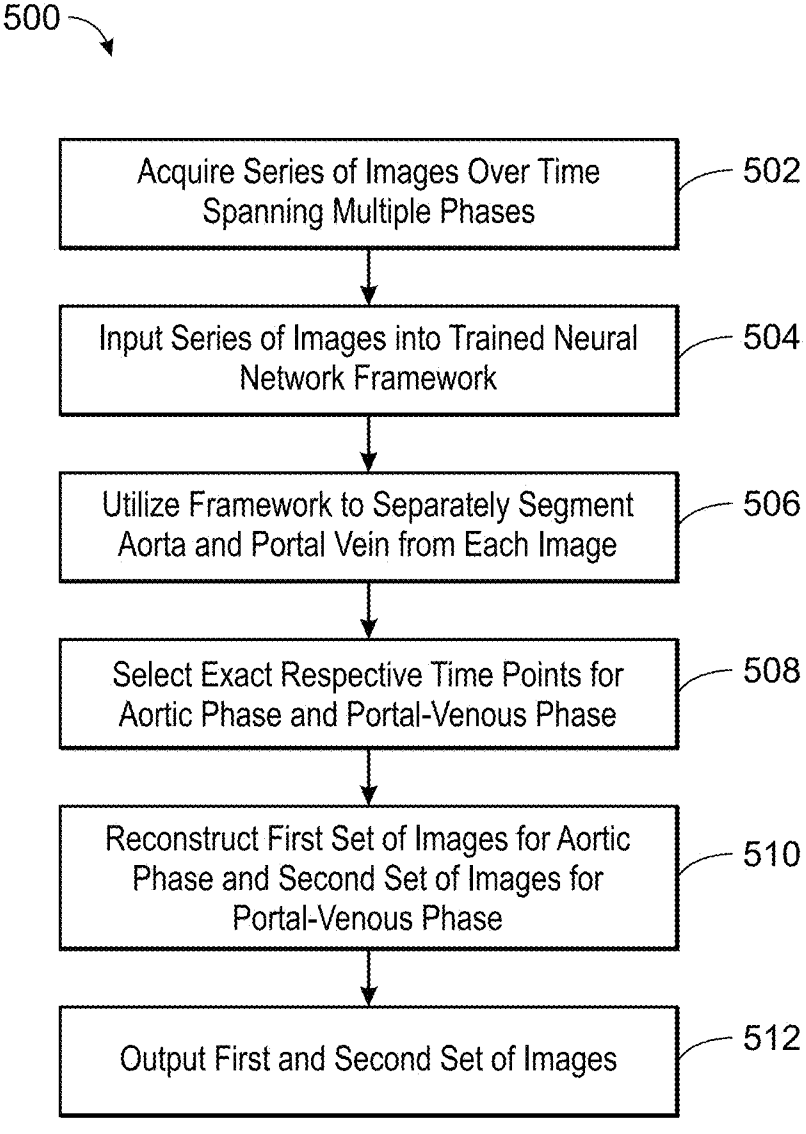
FIG. 5 is a flow diagram of a method for automatic detection of key phases for a contrast-enhanced scan (e.g., incorporating a reconstruction framework), in accordance with aspects of the present disclosure.

FIG. 5 depicts a flow diagram of a method 500 for automatic detection of key phases for a contrast-enhanced scan (e.g., MRI or dynamic CT) (e.g., incorporating a reconstruction framework). One or more steps of the method 500 may be performed by processing circuitry of the MRI apparatus 10 in FIG. 1 or of a CT system.

The method 500 includes acquiring a series (e.g., dynamic series) of images over time from a liver of a subject injected with a contrast bolus (block 502). The series of images span multiple phases of the contrast-enhanced scan including a pre-contrast phase, an aortic phase, a portal-venous phase, and a delayed phase. The series of images are reconstructed from imaging data acquired during the contrast-enhanced scan. In certain embodiments, the subject may be freely breathing (as opposed to holding their breath) during the contrast-enhanced scan.

The method 500 also includes inputting the series of images into a trained neural network framework (block 504). The trained neural network framework includes a phase selection algorithm that includes a first segmentation model (aortic segmentation model) configured to segment the aorta from each image of the series of images and to select peak aortic phase time point. The phase selection algorithm of trained neural network framework also includes a second segmentation model (portal-venous segmentation model) that is separate from the first segmentation model and configured to segment the portal vein from each image of the series of images and select peak portal-venous time point. Each of the segmentation models was trained on multiple contrast enhanced series (e.g., contrast enhanced MRI series) of the abdomen where the aorta and portal vein are manually segmented. In certain embodiments, the training datasets were acquired utilizing stack-of-stars differential subsampling with Cartesian ordering (DISCO Star) and/or stack-of-stars liver acquisition with volume acceleration (LAVA Star). Supervised learning was utilized in training the segmentation models.

The method 500 further includes utilizing the trained neural network framework to separately segment an aorta and a portal vein from each image of the series of images (block 606). In particular, the aortic segmentation model generates segmentation masks of the aorta for aortic phase selection and the portal-venous segmentation model generates segmentation masks of the portal vein for portal-venous phase selection.

The method 500 even further includes utilizing the trained neural network framework to select exact respective time points for at least the aortic phase and the portal-venous phase based on the aorta and the portal vein segmented in each image of the series of images (block 508). The exact respective time points are selected by the trained neural network framework based on respective contrast signal over time in the aorta and the portal vein segmented in each image of the series of images. In certain embodiments, the segmentation masks across phases are averaged to generate a vote-weighted mask where each pixel in the image is weighted based on the votes it receives across all phases. Pixels which are not present in at least 50 percent of phases are labeled as background and the higher weighted pixels are labeled as the anatomy (i.e., aorta or portal vein). The aortic phase selection uses all phases for the voting process as the aorta is clearly defined across time. In the non-portal venous phases, the portal vein is not well defined. Therefore, using the prior that the portal-venous phase occurs approximately after 60 seconds after aortic enhancement, phases between 45 seconds and 75 seconds after aortic enhancement are used to generate the weighted mask for the portal vein. For each slice, the masks are passed through various filters to reduce noise. In certain embodiments, blob labeling is utilized with blobs containing fewer than 20 pixels being categorized as noise and removed from the mask. For the aorta, the largest sized blob is taken as the aorta. For the portal vein, all blobs above the size threshold are utilized. The threshold may vary. Using the resultant mask (i.e., for the aorta or the portal vein), the average signal within the masked region is collected across all phases to generate signal (bolus signal) over time curves for each slice. The signals are clustered based on their correlation to other slices and uncorrelated slice signals are discard. In certain embodiments, two slices are defined as being correlated if they have correlation above 90 percent. In certain embodiments, slices that are correlated with at least 50 percent of other slices are correlated and the resultant signal is taken as the average of all correlated signals. The selected phase corresponds to the phase where the resultant signal achieves a maximum signal. The aorta segmentation model and the portal vein segmentation model are configured to predict the exact ground truth phase with peak enhancement for the aortic phase and the portal-venous phase, respectively.

The method 500 includes reconstructing a first set of images associated with the aortic phase and a second set of images associated with the portal-venous phase from respective image data acquired during the contrast-enhanced scan at the exact respective time points selected by the trained neural network framework (block 510). The method 500 still further includes outputting the first set of images associated with the aortic phase and the second set of images associated with the portal-venous phase based on the exact respective time points selected for the aortic phase and the portal-venous phase (block 512). The first set of images and the second set of images have a higher temporal resolution than the series of images. For example, the series of images may be generated or outputted every 5 seconds while the first and second set of images may be reconstructed every second. The time intervals may vary.

Figure 6:
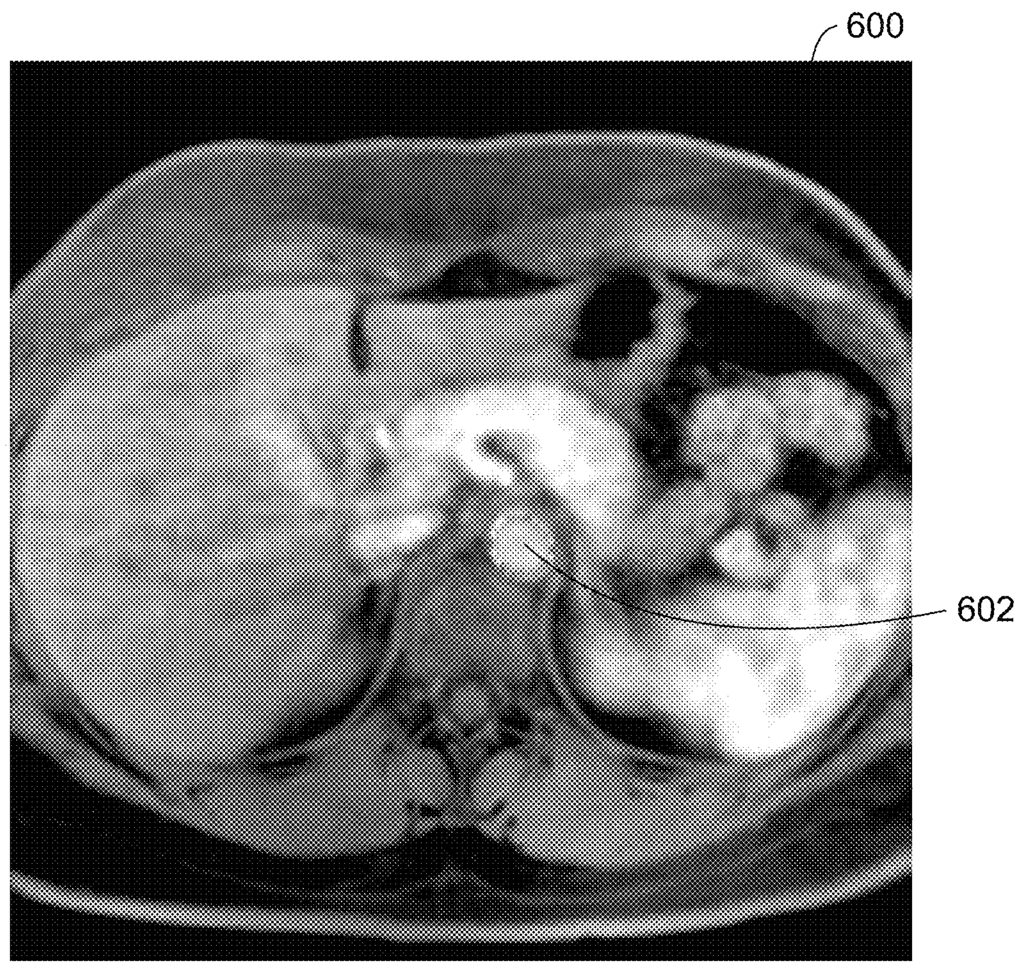
FIG. 6 depicts an example of aortic segmentation of an image generated by an aortic segmentation model, in accordance with aspects of the present disclosure.

FIG. 6 depicts an example of aortic segmentation of an image 600 generated by the aortic segmentation model described above. The image 600 is an MR image of the abdomen including the liver of a subject. Segmentation mask 602 of the aorta is generated by the aortic segmentation model.

Figure 7:
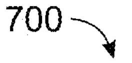
FIG. 7 depicts an example of a graph for an aortic contrast curve comparing respective signals for a ground truth region and a model prediction region, in accordance with aspects of the present disclosure.
Figure 7:
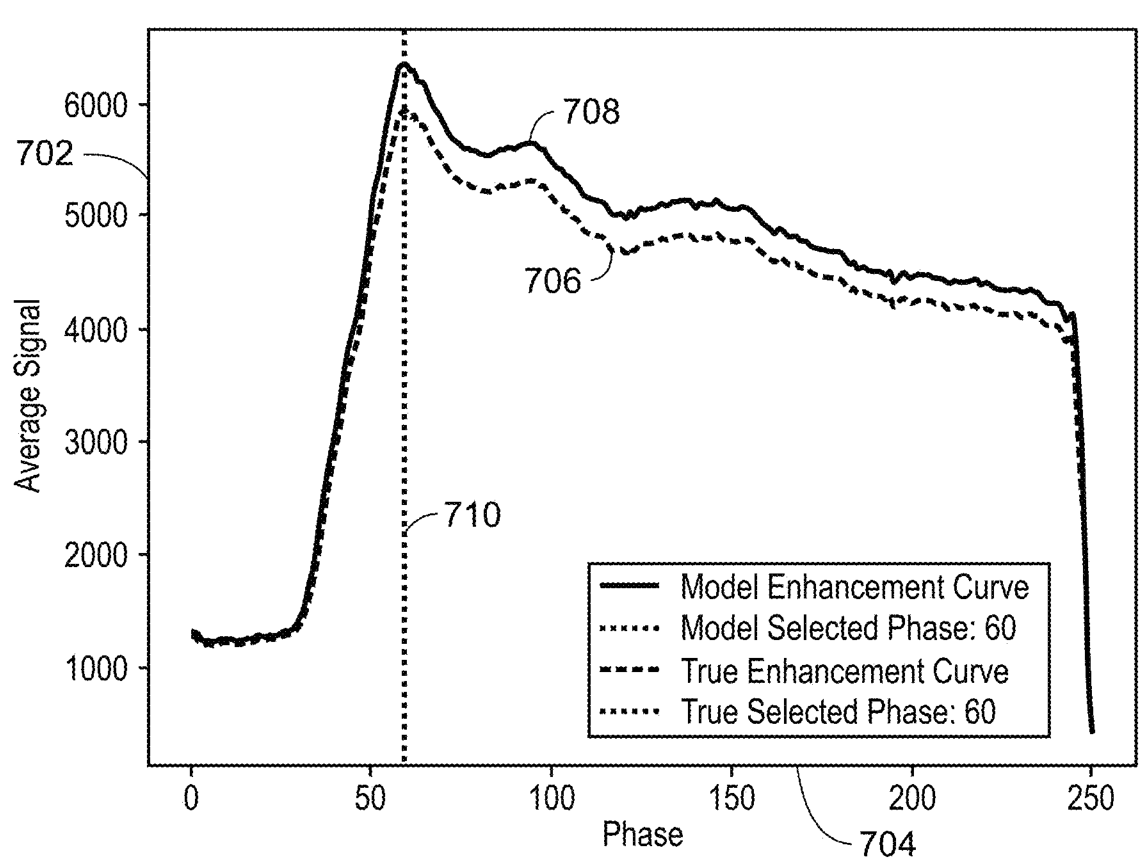

FIG. 7 depicts an example of a graph 700 for an aortic contrast curve comparing respective signals for a ground truth region and a model prediction region. The graph 700 includes a y-axis 702 representing the average signal and an x-axis 704 representing phase. Plot 706 represents the average signal for the ground truth region. Plot 708 represents the average signal for model prediction region (i.e., predicted by the aortic segmentation model). Dashed line 710 represents the resulting max contrast phase selections. Both ground truth region and the model prediction region predicted phase 60 as the max contrast for the aortic phase. The contrast enhancement curve (plot 708) was highly correlated to the ground truth (plot 706) ($\rho$=99.99 percent).

Figure 8:
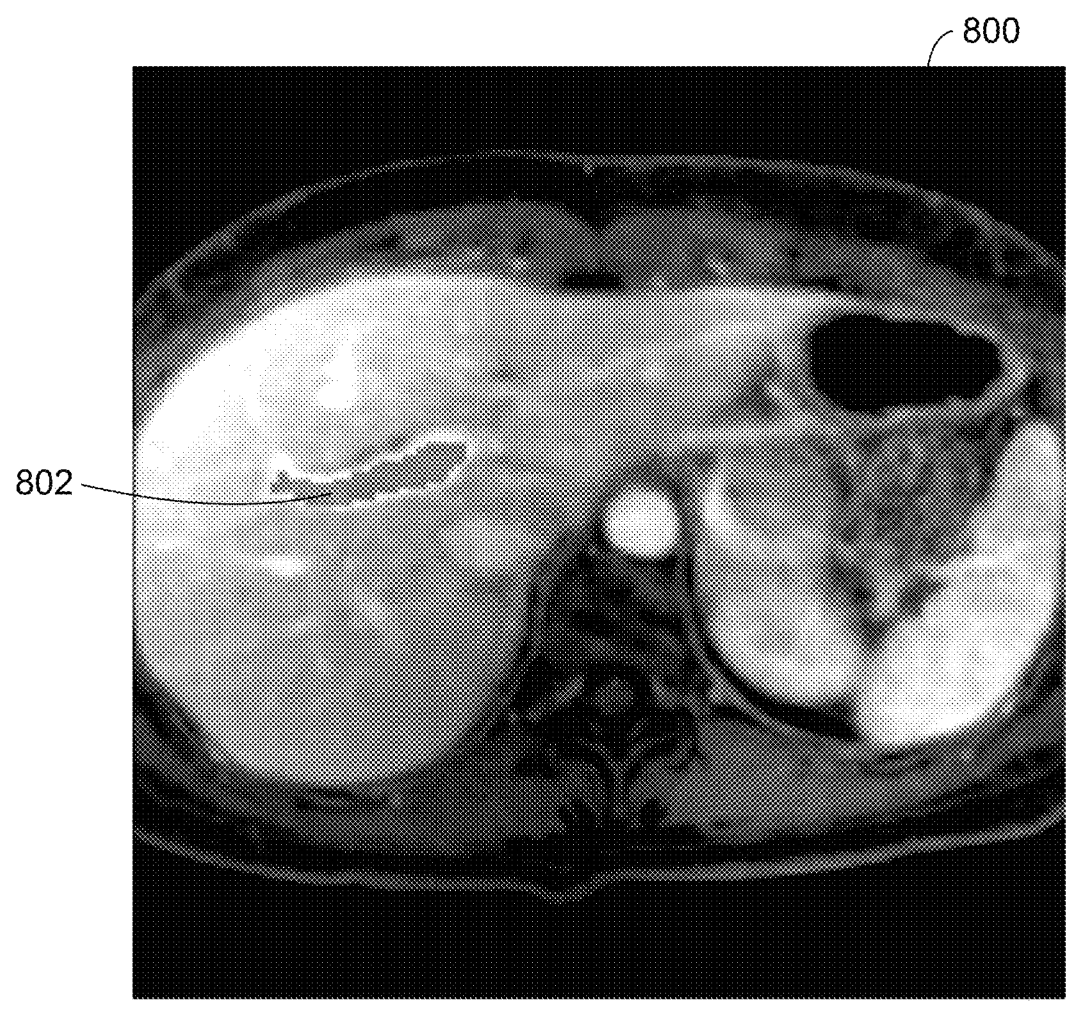
FIG. 8 depicts an example of portal vein segmentation of an image generated by a portal vein segmentation model, in accordance with aspects of the present disclosure.

FIG. 8 depicts an example of portal vein segmentation of an image 800 generated by the portal vein segmentation model described above. The image 800 is an MR image of the abdomen including the liver of a subject. Segmentation mask 802 of the portal vein (e.g., of primary vein branch) is generated by the portal vein segmentation model.

Figure 9:
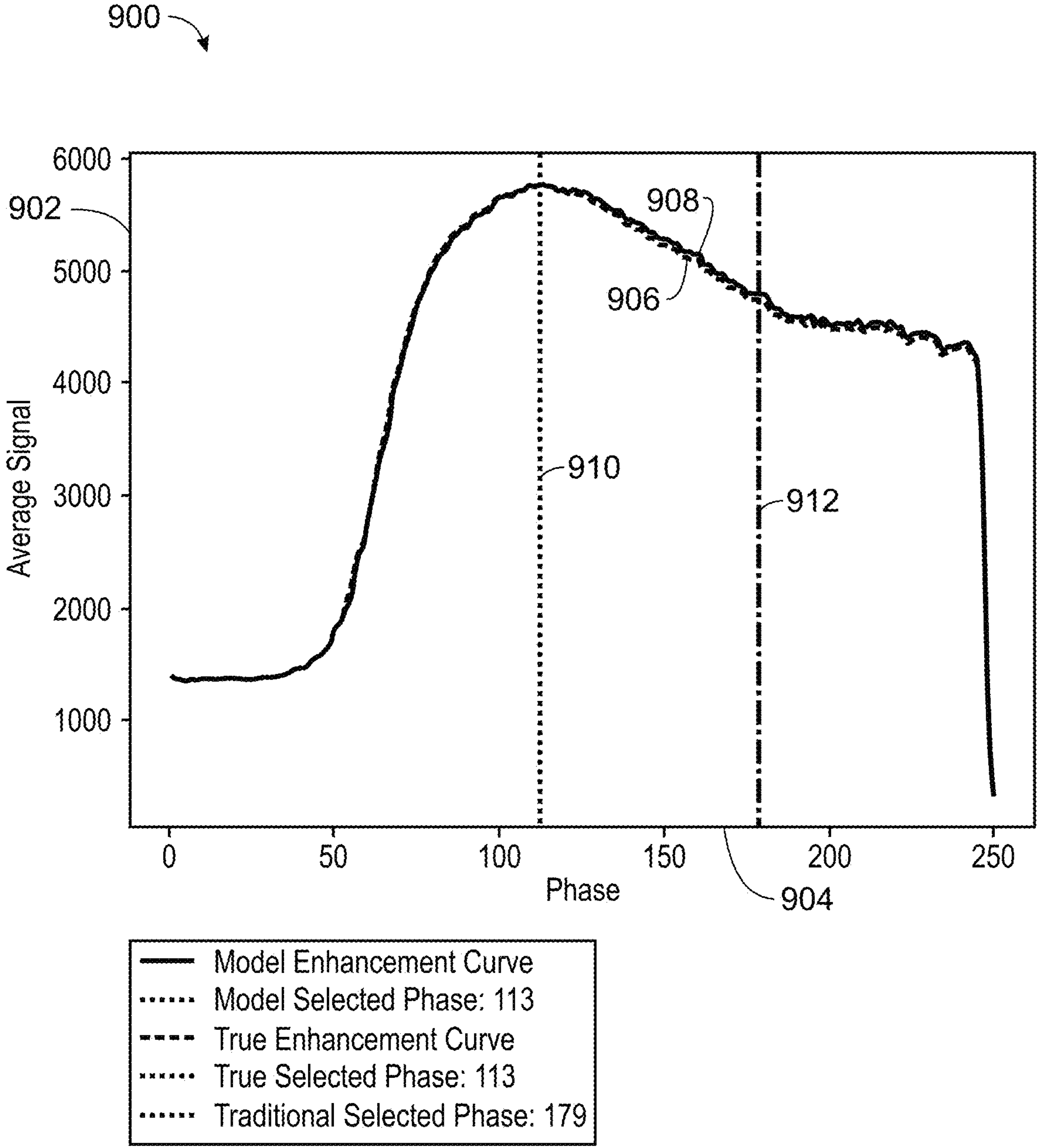
FIG. 9 depicts an example of a graph for a portal vein contrast curve comparing respective signals for a ground truth region and a model prediction region, in accordance with aspects of the present disclosure.

FIG. 9 depicts an example of a graph 900 for a portal vein contrast curve comparing respective signals for a ground truth region and a model prediction region. The graph 900 includes a y-axis 902 representing the average signal and an x-axis 904 representing phase. Plot 906 represents the average signal for the ground truth region. Plot 908 represents the average signal for model prediction region (i.e., predicted by the portal vein segmentation model). Dashed line 910 represents the resulting max contrast phase selections. Both ground truth region and the model prediction region predicted phase 113 as the max contrast for the portal-venous phase. Dashed line 912 represents phase selected (i.e., phase 179) by a traditional phase selection method. The contrast enhancement curve (plot 908) was highly correlated to the ground truth (plot 906) ($\rho$=99.98 percent), while the traditional phase selection method is not.

Figure 10:
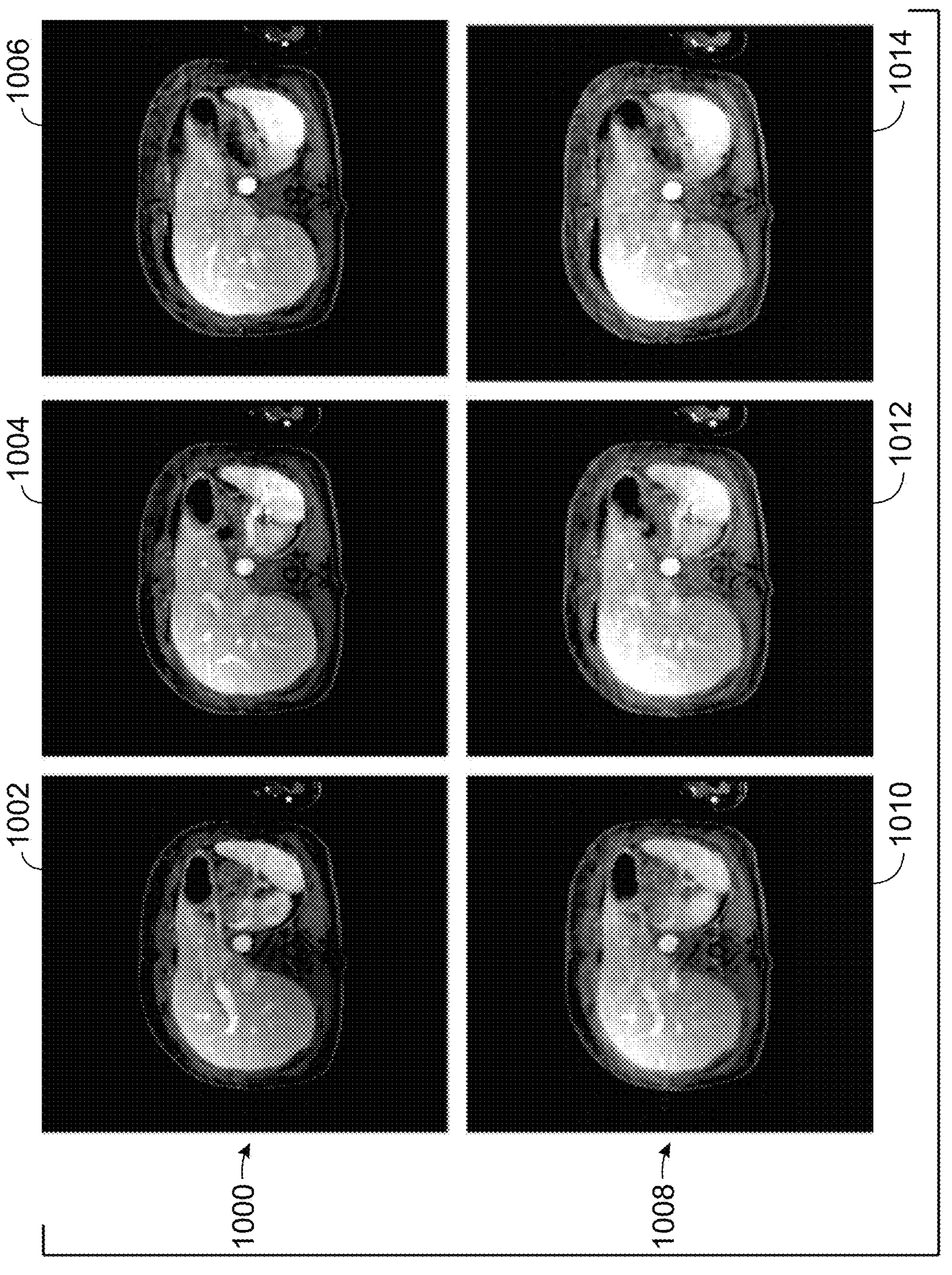
FIG. 10 depicts selected images from each phase predicted by the neural network framework method and the traditional method, in accordance with aspects of the present disclosure.

FIG. 10 depicts selected images from each phase predicted by the neural network framework method and the traditional method. A top row 1000 of FIG. 10 depicts images 1002, 1004, and 1006 (e.g., MR images of the abdomen including the liver of a subject) selected for the portal-venous phase as predicted by the neural network framework as described above (which is the same as the ground truth). Images 1002, 1004, and 1006 are slices 60, 65, and 70, respectively. A bottom row 1008 of FIG. 10 depicts images 1010, 1012, and 1014 selected via a traditional phase selection method for the portal venous phase which are different from the slices selected by the neural network method and the ground truth. Images 1002, 1004, and 1006 for the portal-venous phase by the neural network framework have higher levels of detail and less graininess from noise than the images 1010, 1012, and 1014 selected via the traditional method.

Technical effects of the disclosed subject matter include utilizing neural network framework-based (e.g., AI or CNN-based) segmentation for automated key phase detection in dynamic contrast-enhanced magnetic resonance imaging. Technical effects of the disclosed embodiments include speeding up of post-processing/interpretation workflow.

Instead of manually searching through images, which takes time and is prone to human error, optimal images can be found without human supervision. Technical effects of the disclosed embodiments include improving the image quality of the selected phases.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for automatic detection of key phases for a contrast-enhanced scan, comprising:

- acquiring, via a processing system comprising one or more processors, a series of images over time of a liver of a subject injected with a contrast bolus, wherein the series of images span multiple phases of the contrast-enhanced scan, and wherein the multiple phases comprise a pre-contrast phase, an aortic phase, a portal-venous phase, and a delayed phase;
- inputting, via the processing system, the series of images into a trained neural network framework;
- utilizing, via the processing system, the trained neural network framework to separately segment an aorta and a portal vein from each image of the series of images;
- utilizing, via the processing system, the trained neural network framework to select exact respective time points for at least the aortic phase and the portal-venous phase based on the aorta and the portal vein segmented in each image of the series of images; and
- outputting, via the processing system, a first set of images associated with the aortic phase and a second set of images associated with the portal-venous phase based on the exact respective time points selected for the aortic phase and the portal-venous phase.

2. The computer-implemented method of claim 1, wherein the exact respective time points are selected by the trained neural network framework based on respective contrast signal over time in the aorta and the portal vein segmented in each image of the series of images.

3. The computer-implemented method of claim 1, wherein the first set of images and the second set of images are from the series of images.

4. The computer-implemented method of claim 1, further comprising reconstructing, via the processing system, the first set of images and the second set of images from respective image data acquired during the contrast-enhanced scan at the exact respective time points selected by the trained neural network framework.

5. The computer-implemented method of claim 4, wherein the first set of images and the second set of images have a higher temporal resolution than the series of images.

6. The computer-implemented method of claim 1, wherein the trained neural network framework comprises a first segmentation model configured to segment the aorta from each image of the series of images and to select peak aortic phase time point, and the trained neural network framework comprises a second segmentation model that is separate from the first segmentation model and configured to segment the portal vein from each image of the series of images and select peak portal-venous time point.

7. The computer-implemented method of claim 1, wherein the contrast-enhanced scan is a magnetic resonance contrast-enhanced scan.

8. A system for selecting reference images for automatic detection of key phases for a contrast-enhanced scan, comprising:

- a memory encoding processor-executable routines; and
- a processing system comprising one or more processors and configured to access the memory and to execute the processor-executable routines, wherein the processor-executable routines, when executed by the processing system, cause the processing system to:
  - acquire a series of images over time of a liver of a subject injected with a contrast bolus, wherein the series of images span multiple phases of the contrast-enhanced scan, and wherein the multiple phases comprise a pre-contrast phase, an aortic phase, a portal-venous phase, and a delayed phase;
  - input the series of images into a trained neural network framework;
  - utilize the trained neural network framework to separately segment an aorta and a portal vein from each image of the series of images;
  - utilize the trained neural network framework to select exact respective time points for at least the aortic phase and the portal-venous phase based on the aorta and the portal vein segmented in each image of the series of images; and
  - output a first set of images associated with the aortic phase and a second set of images associated with the portal-venous phase based on the exact respective time points selected for the aortic phase and the portal-venous phase.

9. The system of claim 8, wherein the exact respective time points are selected by the trained neural network framework based on respective contrast signal over time in the aorta and the portal vein segmented in each image of the series of images.

10. The system of claim 8, wherein the first set of images and the second set of images are from the series of images.

11. The system of claim 8, wherein the processor-executable routines, when executed by the processing system, further cause the processing system to reconstruct the first set of images and the second set of images from respective image data acquired during the contrast-enhanced scan at the exact respective time points selected by the trained neural network framework.

12. The system of claim 11, wherein the first set of images and the second set of images have a higher temporal resolution than the series of images.

13. The system of claim 8, wherein the trained neural network framework comprises a first segmentation model configured to segment the aorta from each image of the series of images and to select peak aortic phase time point, and the trained neural network framework comprises a second segmentation model that is separate from the first segmentation model and configured to segment the portal vein from each image of the series of images and select peak portal-venous time point.

14. The system of claim 8, wherein the contrast-enhanced scan is a magnetic resonance contrast-enhanced scan.

15. A non-transitory computer-readable medium, the computer-readable medium comprising processor-executable code that when executed by a processing system comprising one or more processors, causes the processing system to:

acquire a series of images over time of a liver of a subject injected with a contrast bolus, wherein the series of images span multiple phases of a contrast-enhanced scan, and wherein the multiple phases comprise a pre-contrast phase, an aortic phase, a portal-venous phase, and a delayed phase;

input the series of images into a trained neural network framework;

utilize the trained neural network framework to separately segment an aorta and a portal vein from each image of the series of images;

utilize the trained neural network framework to select exact respective time points for at least the aortic phase and the portal-venous phase based on the aorta and the portal vein segmented in each image of the series of images; and output a first set of images associated with the aortic phase and a second set of images associated with the portal-venous phase based on the exact respective time points selected for the aortic phase and the portal-venous phase.

16. The non-transitory computer-readable medium of claim 15, wherein the exact respective time points are selected by the trained neural network framework based on respective contrast signal over time in the aorta and the portal vein segmented in each image of the series of images.

17. The non-transitory computer-readable medium of claim 16, wherein the first set of images and the second set of images are from the series of images.

18. The non-transitory computer-readable medium of claim 15, wherein the processor-executable code, when executed by the processing system, further causes the processing system to utilize the trained neural network framework to select the exact respective time points for the pre-contrast phase and delayed phase based on the aorta and the portal vein segmented in each image of the series of images.

19. The non-transitory computer-readable medium of claim 18, wherein the trained neural network framework comprises a first segmentation model configured to segment the aorta from each image of the series of images and to select peak aortic phase time point, and the trained neural network framework comprises a second segmentation model that is separate from the first segmentation model and configured to segment the portal vein from each image of the series of images and select peak portal-venous time point.

20. The non-transitory computer-readable medium of claim 15, wherein the first set of images and the second set of images have a higher temporal resolution than the series of images.

* * * * *